(12) United States Patent
Mosbach et al.

(10) Patent No.: US 11,536,329 B2
(45) Date of Patent: Dec. 27, 2022

(54) BRAKE PAD FOR A DISK BRAKE

(71) Applicant: KNORR-BREMSE SYSTEME FÜR SCHIENENFAHRZEUGE GMBH, Munich (DE)

(72) Inventors: Christian Mosbach, Alling (DE); Bernhard Hämmerl, Maisach (DE); Marco Langwadt, Munich (DE)

(73) Assignee: KNORR-BREMSE SYSTEME FÜR SCHIENENFAHRZEUGE GMBH

(*) Notice: Subject to any disclaimer, the term of this patent is extended or adjusted under 35 U.S.C. 154(b) by 108 days.

(21) Appl. No.: 16/649,917

(22) PCT Filed: Sep. 18, 2018

(86) PCT No.: PCT/EP2018/075133
§ 371 (c)(1),
(2) Date: Mar. 23, 2020

(87) PCT Pub. No.: WO2019/057684
PCT Pub. Date: Mar. 28, 2019

(65) Prior Publication Data
US 2020/0309207 A1 Oct. 1, 2020

(30) Foreign Application Priority Data
Sep. 21, 2017 (DE) .................. 10 2017 121 879.3

(51) Int. Cl.
*F16D 65/08* (2006.01)
*F16D 55/225* (2006.01)
(Continued)

(52) U.S. Cl.
CPC .......... *F16D 55/225* (2013.01); *F16D 65/097* (2013.01); *F16D 65/124* (2013.01);
(Continued)

(58) Field of Classification Search
CPC .... F16D 55/225; F16D 65/092; F16D 65/095; F16D 65/097; F16D 65/0972;
(Continued)

(56) References Cited

U.S. PATENT DOCUMENTS 7,051,847 B2 * 5/2006 Wirth ............... F16D 65/092
188/250 B
10,816,050 B2 * 10/2020 Elstorpff ............ F16D 65/092
(Continued)

FOREIGN PATENT DOCUMENTS

CN 101363488 A 2/2009
CN 201714879 U 1/2011
(Continued)

OTHER PUBLICATIONS

International Search Report and Written Opinion corresponding to PCT/EP2018/075133, dated Dec. 19, 2018.

*Primary Examiner* — Christopher P Schwartz
(74) *Attorney, Agent, or Firm* — Barnes & Thornburg LLP

(57) ABSTRACT

A brake pad for a disk brake of a vehicle, in particular a rail vehicle, includes a backing plate, to which a plurality of friction units is fastened, each using a securing element supported on the rear side of the backing plate facing away from the friction unit, wherein each friction unit has, on the side of the backing plate facing away from the securing element, a friction element, which is mounted for tilting by means of a spherical-portion-shaped attachment and under the load of a spring supported on the backing plate, is designed in such a way that an annular disk is arranged between the spring and the friction element, at least some regions of said disk lying against the spring and the friction element.

16 Claims, 2 Drawing Sheets

(51) Int. Cl.
*F16D 65/097* (2006.01)
*F16D 65/12* (2006.01)
*F16D 55/00* (2006.01)

(52) U.S. Cl.
CPC ......... *F16D 65/125* (2013.01); *F16D 65/127* (2013.01); *F16D 2055/0008* (2013.01)

(58) Field of Classification Search
CPC .. F16D 65/0977; F16D 65/125; F16D 65/127; F16D 65/08
USPC .................... 188/73.36–73.38, 250 B, 250 G
See application file for complete search history.

(56) References Cited

U.S. PATENT DOCUMENTS

| | | | |
|---|---|---|---|
| 2006/0237270 A1 | 10/2006 | Maehara | |
| 2008/0047790 A1* | 2/2008 | Muller | F16D 65/0972 |
| | | | 188/250 B |
| 2012/0211314 A1* | 8/2012 | Holme | F16D 65/092 |
| | | | 188/73.38 |
| 2018/0372173 A1 | 12/2018 | Elstorpff et al. | |
| 2019/0078629 A1* | 3/2019 | Sakayama | B61H 5/00 |
| 2019/0120307 A1* | 4/2019 | Schlauss | F16D 65/092 |

FOREIGN PATENT DOCUMENTS

| | | |
|---|---|---|
| CN | 102007315 A | 4/2011 |
| CN | 202194976 U | 4/2012 |
| CN | 103629273 A | 3/2014 |
| DE | 4436457 A1 | 4/1996 |
| DE | 202011001991 U1 | 5/2011 |
| DE | 102015109034 A1 | 12/2016 |
| DE | 102016100454 A1 | 7/2017 |
| EP | 2023000 A1 | 11/2009 |

* cited by examiner

BRAKE PAD FOR A DISK BRAKE

CROSS REFERENCE AND PRIORITY CLAIM

This patent application is a U.S. National Phase of International Patent Application No. PCT/EP2018/075133 filed Sep. 18, 2018, which claims priority to German Patent Application No. 10 2017 121 8793, the disclosure of which being incorporated herein by reference in their entireties.

FIELD

Disclosed embodiments relate to a brake pad for a disk brake of a vehicle, in particular of a rail vehicle.

BACKGROUND

Above all, in the case of rail vehicles which reach high speeds, brake pads are used, the friction elements of which consist of a hard material.

In order to achieve a satisfactory contact pattern, that is to say a uniform surface pressure of the friction elements on the friction face of the brake disk, a so-called Flexpad brake pad is known.

Here, friction elements of friction units are provided in the contact region with the carrier plate with spherical section-shaped attachments which lie in the spherical cap-shaped receptacles which are adapted to them, with the result that the friction elements can be moved with a tilting movement.

Here, the term "can be moved with a tilting movement" denotes relative tilting between the brake disk of the disk brake and the surface of the brake pad. During the braking operation, the two surfaces are ideally oriented in parallel, with the result that tilting leads to a non-parallel orientation of the brake pad and the disk of the disk brake.

SUMMARY

Disclosed embodiments are provide a brake pad such that, in particular, the thermal and mechanical loading of the respective friction unit is reduced and the service life of the brake pad overall is increased.

BRIEF DESCRIPTION OF FIGURES

Exemplary embodiments will be described in the following text on the basis of the appended drawings, in which.

DETAILED DESCRIPTION

Figure 1:
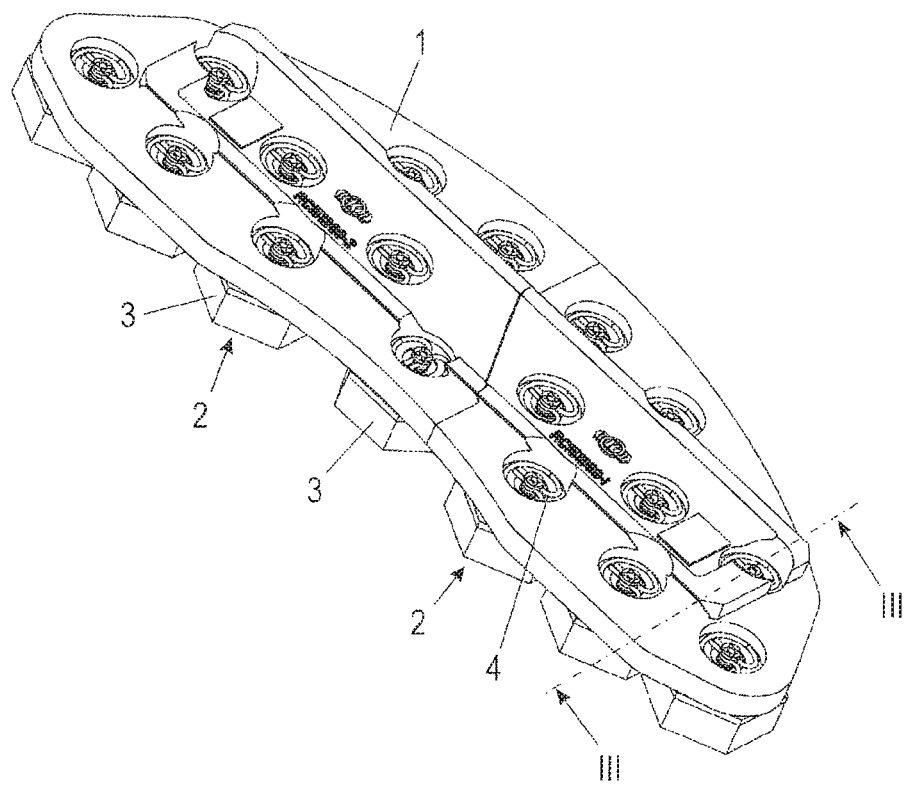
FIG. 1 shows a brake pad in a perspective rear view.

The particularly satisfactory thermal contact pattern of the brake pad is based on the movability of the plurality of friction elements in the known construction, which friction elements can follow unevennesses which are present on the brake disk as a result.

As a result of the mounting, a displacement of the friction elements takes place virtually without a change in the contact pressure which is substantially identical in all friction elements. As a consequence, a homogeneous contact pattern is produced and local hot spots on the brake disk are avoided.

As mentioned, the Flexpad brake pad is used predominantly for trains in the high speed range on account of its high performance, very pronounced heating of the entire brake pad taking place during a braking operation, however.

A brake pad of the generic type is disclosed in DE 10 2016 100 454 A1. In the case of the brake pad, a multiplicity of friction units are fastened to the carrier plate in each case using a securing element, each friction unit having a friction element and a spring in the form of a cup spring, by way of which the friction element is spring-loaded.

Furthermore, on its side which faces the carrier plate, the friction element has the spherical section-shaped attachment which makes a tilting movability possible and which is supported on an edge which is formed by way of the inner contour of the cup spring.

The spring serves for the axial offset of the friction element and makes tilting of the friction element possible in a kinematic manner and in addition on account of the elasticity.

The known brake pad has certainly proven itself in practice and meets requirements to the predefined extent with regard to its braking action and braking performance.

In the case of a high thermal and mechanical overload, however, a reduction in the flexibility of the respective friction unit can be produced, the causes for this being a temperature/time-induced relaxation of the spring and/or mechanical wear at the contact point between the spring and the friction element.

Moreover, the direct contact of the spherical section-shaped attachment of the friction element with the inner edge of the cup spring can impede the tilting movability and an axial offset of the friction element and, moreover, can lead in some circumstances to increased wear of the attachment, which naturally has a disadvantageous influence on the service life of the friction unit overall, but above all of the friction element.

Disclosed embodiments provide a brake pad of the generic type in such a way that, in particular, the thermal and mechanical loading of the respective friction unit is reduced and the service life of the brake pad overall is increased.

The configuration of the brake pad, according to which an annular disk is arranged as an intermediate layer between the spring, in particular the cup spring, and the friction element, results in a whole series of advantages which contribute to a considerable reduction of the operating costs and to an increase of the thermal durability.

For instance, the annular disk acts in the manner of a heat shield for the spring, as a result of which the risk of the temperature-induced relaxation described in respect of the prior art is minimized.

The surface dimensions of the disk are optionally dimensioned in such a way that the disk substantially covers the spring.

In accordance with one advantageous development of the disclosed embodiments, the disk has a concentric spherical cap-shaped depression, in which the spherical section-shaped attachment of the friction element lies.

This provides a plain bearing system which considerably improves the flexibility of the friction element, in particular with regard to tilting about the rotational center and an axial offset.

The wear of the spherical section-shaped attachment is avoided, or at least greatly reduced, by way of the likewise resulting large-area contact between the friction element and the spherical cap-shaped depression of the annular disk.

In accordance with a further concept of the disclosed embodiments, the abovementioned lower thermal loading of the spring as a result of the disk is assisted by way of a suitable material selection of the disk.

Here, an austenitic, stainless spring steel with a thermal conductivity of 15 W/mK and a tensile strength of approximately 800-1200 MPa, optionally 1000 MPa, is the optional choice, whereby the braking energy which occurs during a braking operation acts merely to a small, harmless proportion on the heat-sensitive components, above all on the spring.

Furthermore, the disk can be configured in such a way that it bears substantially only in the regions which are defined by way of the outer faces of the spherical cap-shaped depression on one side against the spherical section-shaped section of the friction element and on the other side against the inner contour edge of the spring. The adjoining radial level region of the disk is arranged spaced apart both from the spring and from the friction element, which results in an insulating air layer which likewise leads to a reduced thermal transfer to the spring.

The result overall is that the flexibility of the friction elements which is the most important prerequisite for the functional properties of the so-called flexible brake pad is influenced advantageously over the service life.

Moreover, the movability of the individual friction elements is improved considerably by way of the so-called spherical cap bearing system which results from the spherical cap-shaped depression of the annular disk in correspondence with the spherical section-shaped attachment of the friction element, which leads to a maximization of the functional properties of the brake pad.

The axial movement play between the friction element and the carrier plate can be set to a limited extent by way of the configuration of the spherical cap-shaped depression of the disk, which likewise contributes to a functional optimization.

It is to be emphasized, moreover, that the disclosed embodiments can be realized with low structural and manufacturing technology complexity, since the annular disk can be produced from a simple shaped sheet metal part, optionally a circular blank, to be precise by way of stamping and forming.

In the following description of the figures, terms such as top, bottom, left, right, front, back, etc. refer exclusively to the exemplary illustration and position selected in the respective figures of the brake pad, the disk brake, the carrier plate, the securing element and the like. These terms are not to be understood to be restrictive, that is to say these references can change as a result of different operating positions or the mirror-symmetrical layout or the like.

Figure 2:
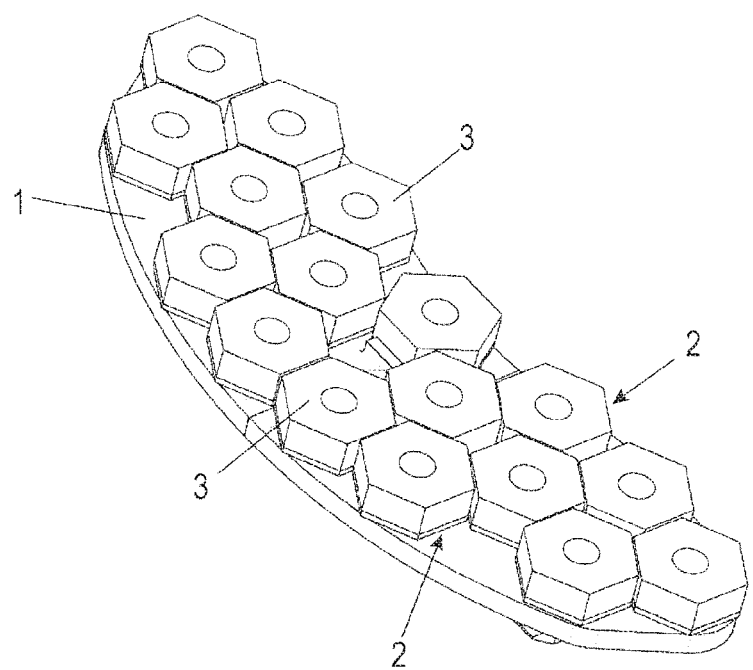
FIG. 2 shows the brake pad in a perspective front view.
Figure 3:
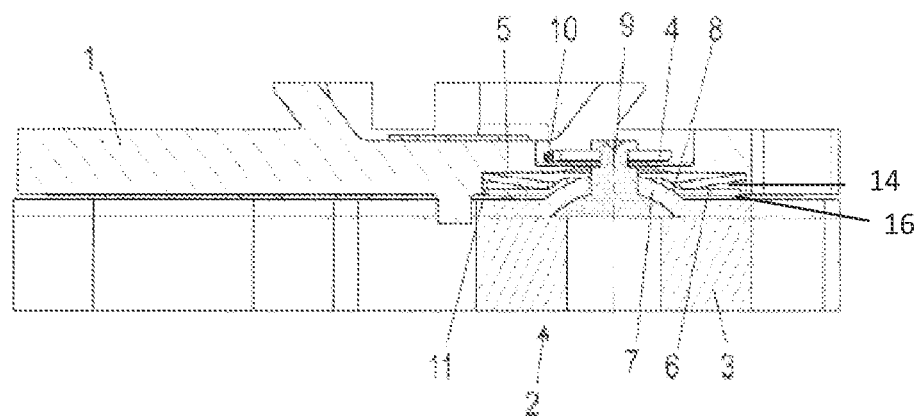
FIG. 3 shows a section through the brake pad in accordance with the line in FIG. 1.

FIGS. 1 and 2 show a brake pad for a disk brake, in particular of a rail vehicle, with a plurality of friction units 2 which are connected to a carrier plate 1 and of which one is shown as a detail in section in FIG. 3.

Each friction unit 2 is held on the carrier plate 1 by way of a securing element 4 in the form of a loop spring on the rear side, to which end a friction element 3 of the friction unit 2 has a pin 9 which passes through the carrier plate 1 and to which the securing element 4 which lies in a recess 10 of the carrier plate 1 is fastened.

In addition to the friction element 3, the friction unit 2 has a spring 5 in the form of a cup spring which is curved toward the friction element 3 and is supported in a sack-like cutout 11 of the carrier plate 1, the cutout 11 being provided on that side of the carrier plate 1 which lies opposite the recess 10.

Figure 4:
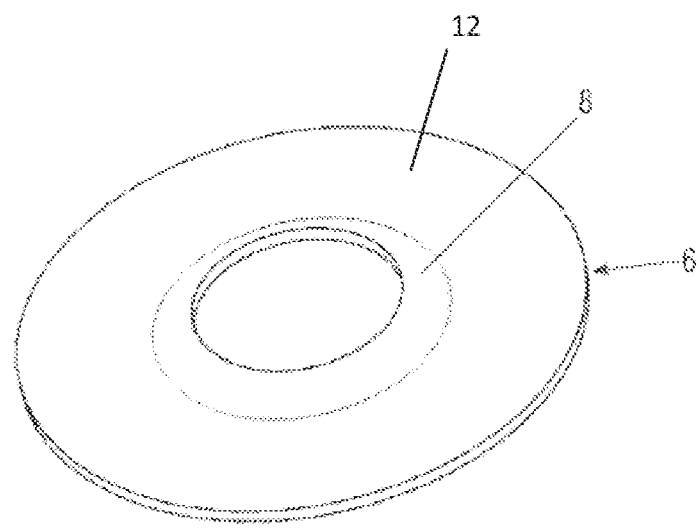
FIG. 4 shows a detail of the brake pad in a perspective view.

In accordance with disclosed embodiments, an annular disk 6 which can be seen as a detail in FIG. 4 is arranged between the friction element 3 and the spring 5.

Here, the annular disk 6 bears at least in regions against the spring 5 and the friction element 3. Here, the disk 6 and the spring 5 are arranged in the cutout 11 of the carrier plate 1.

The disk 6 is provided concentrically with a spherical cap-like depression 8, in which a spherical section-shaped attachment 7 of the friction element 3 lies, which friction element 3 is mounted as a result such that it can be moved with a tilting movement with respect to the disk 6.

The spherical cap-shaped depression 8 protrudes into a center opening of the spring 5, and is supported on the edge which delimits the center opening. In this way, centering both of the friction element 3 and of the disk 6 is achieved.

The spherical cap-shaped depression 8 of the disk 6 is adjoined radially by a circumferential edge region which is configured here as a flange and runs at a spacing both from the friction element 3 and from the spring 5, with the configuration of in each case one gap which forms an insulating air layer.

The spherical cap-shaped depression 8 of the disk 6 is adjoined radially by a circumferential edge region 12 which is configured here as a flange and runs at a spacing both from the friction element 3 and from the spring 5, with the configuration of in each case one gap 16, 14 which forms an insulating air layer.

Here, the disk 6 optionally includes an austenitic, stainless spring steel with a thermal conductivity of approximately 15 W/mK and a tensile strength of approximately 800-1200 MPa, optionally approximately 1000 MPa.

LIST OF DESIGNATIONS

1 Carrier plate
2 Friction unit
3 Friction element
4 Securing element
5 Spring
6 Disk
7 Spherical segment-shaped attachment
8 Depression
9 Pin
10 Recess
11 Cutout

The invention claimed is:

1. A brake pad for a disk brake of a rail vehicle, the brake pad comprising:
   a carrier plate, to which a plurality of friction units are each fastened by a securing element, which is supported on a rear side of the carrier plate which faces away from the friction units, the respective friction units each having, on that side of the carrier plate which faces away from the securing element, a friction element which is mounted such that the friction element is movable in a tilting manner by a spherical section-shaped attachment and such that the friction element is loaded by way of a spring which is supported on the carrier plate; and
   an annular disk arranged between the spring and the friction element, which annular disk bears at least in regions against the spring and the friction element,
   wherein a flange of the disk extends at a distance between the spring and the friction element forming an insulating air layer gap between the flange and each of the spring and the friction element.

2. The brake pad of claim 1, wherein the disk has a concentric, spherical cap-shaped depression, in which the spherical section-shaped attachment of the friction element lies.

3. The brake pad of claim 2, wherein the disk consists of an austenitic, stainless spring steel with a thermal conductivity of approximately 15 W/mK and a tensile strength of approximately 800-1200 MPa.

4. The brake pad of claim 3, wherein the disk consists of an austenitic, stainless spring steel with a thermal conductivity of approximately 15 W/mK and a tensile strength of approximately 1000 MPa.

5. The brake pad of claim 2, wherein an outer side of the spherical cap-shaped depression, which outer side faces away from the spherical section- shaped attachment, bears against an edge which delimits a center opening of the spring, the spring being configured as a cup spring, with a curvature which is directed toward the friction element.

6. The brake pad of claim 2, wherein the spherical cap-shaped depression is adjoined by the flange.

7. The brake pad of claim 2, wherein the disk is dimensioned in terms of its external dimensions in such a way that it largely covers the spring and the friction element.

8. The brake pad of claim 2, wherein an outer side of the spherical cap-shaped depression, which outer side faces away from the spherical section-shaped attachment, bears against an edge which delimits a center opening of the spring, the spring being configured as a cup spring, with a curvature which is directed toward the friction element.

9. The brake pad of claim 2, wherein the disk is dimensioned in terms of its external dimensions in such a way that it largely covers the spring and the friction element.

10. The brake pad of claim 2, wherein the disk and the spring are arranged in a cutout of the carrier plate.

11. The brake pad of claim 1, wherein the disk consists of an austenitic, stainless spring steel with a thermal conductivity of approximately 15 W/mK and a tensile strength of approximately 800-1200 MPa.

12. The brake pad of claim 11, wherein the disk consists of an austenitic, stainless spring steel with a thermal conductivity of approximately 15 W/mK and a tensile strength of approximately 1000 MPa.

13. The brake pad of claim 1, wherein an outer side of the spherical cap-shaped depression, which outer side faces away from the spherical section-shaped attachment, bears against an edge which delimits a center opening of the spring, the spring being configured as a cup spring, with a curvature which is directed toward the friction element.

14. The brake pad of claim 1, wherein the spherical cap-shaped depression is adjoined by the flange.

15. The brake pad of claim 1, wherein the disk is dimensioned in terms of its external dimensions in such a way that it largely covers the spring and the friction element.

16. The brake pad-of claim 1, wherein the disk and the spring are arranged in a cutout of the carrier plate.

\* \* \* \* \*